United States Patent [19]
Remy et al.

[11] 3,850,570
[45] Nov. 26, 1974

[54] LIGHTERS

[75] Inventors: Hermann Remy, Dietzenbach-Steinberg; Adolf Lamprecht, Hausen, both of Germany

[73] Assignee: Rowenta-Werke GmbH, Offenbach/Main, Germany

[22] Filed: Feb. 19, 1974

[21] Appl. No.: 443,396

Related U.S. Application Data

[63] Continuation-in-part of Ser. No. 273,400, July 20, 1972.

[30] Foreign Application Priority Data
Feb. 24, 1973 Germany ..................... 2309355

[52] U.S. Cl. ............................... 431/255, 317/96
[51] Int. Cl. ......................................... F23q 2/28
[58] Field of Search ......... 431/254, 255; 317/81, 96

[56] References Cited
UNITED STATES PATENTS
| | | | |
|---|---|---|---|
| 3,696,271 | 10/1972 | Halm | 317/81 |
| 3,771,943 | 11/1973 | Schlamp | 431/255 |
| 3,781,163 | 12/1973 | Ovens | 431/255 X |

*Primary Examiner*—Edward G. Favors
*Attorney, Agent, or Firm*—George R. Clark; Neil M. Rose; Clifford A. Dean

[57] ABSTRACT

An electrically ignited gas lighter with photoelectric transducers as the prime electrical energy source. Power from the photoelectric transducers is stored in accumulator cells and selectively metered through charging of a capacitor to a spark ignition circuit operable by discharge of the capacitor across a spark gap. An alternative embodiment has direct charging of the capacitor from the photoelectric transducers. Voltage multiplication by parallel connection of accumulator cells to the photoelectric transducers and series connection to the capacitor is disclosed, also by means of step-up transformers and d.c. converters connected between the photoelectric transducers and the accumulator cells and between the capacitor and the discharge gap. Also disclosed are arrangements incorporating lenses and/or prisms to optimize light capture by the photoelectric transducers.

9 Claims, 29 Drawing Figures

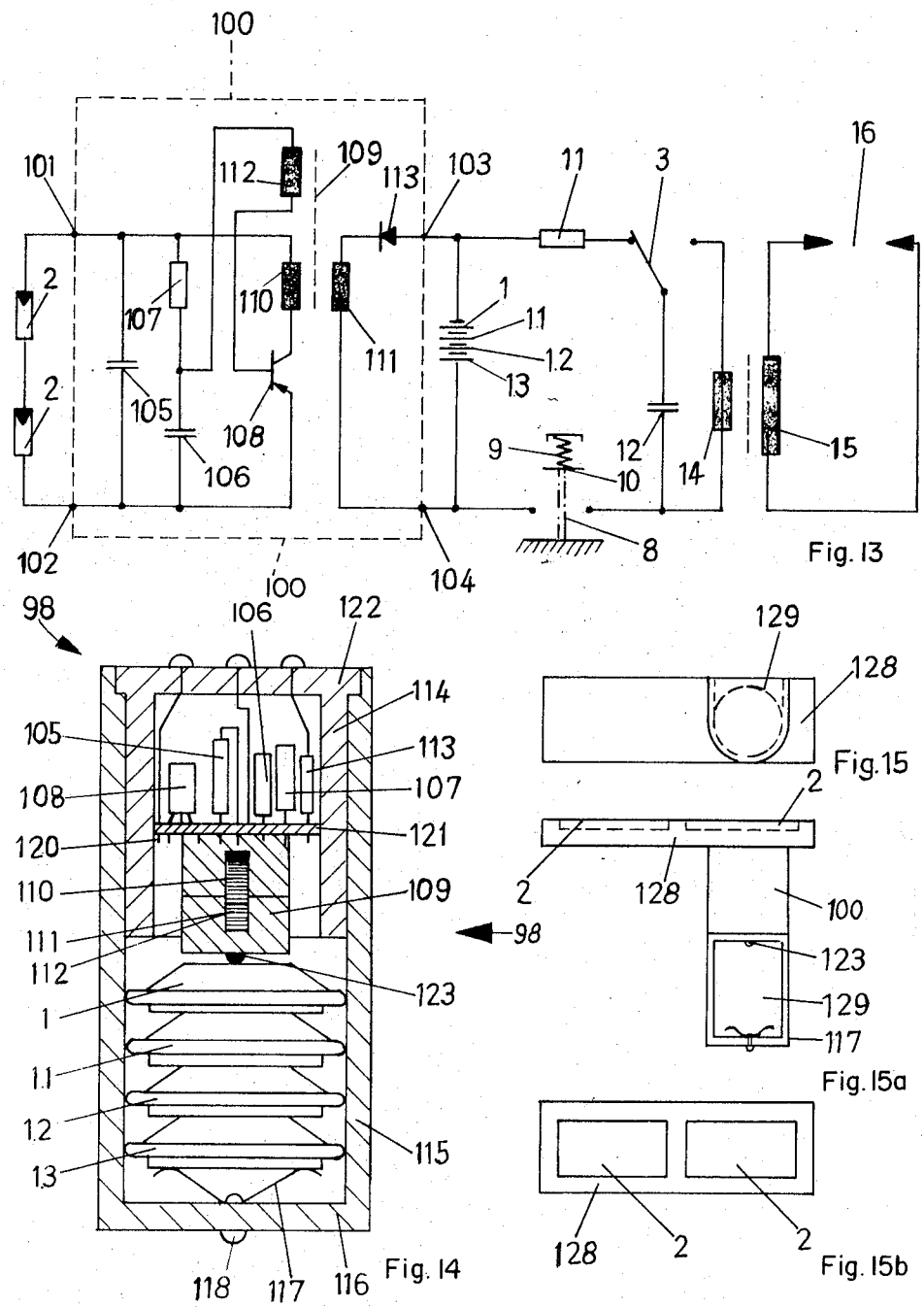

LIGHTERS

This application is a continuation-in-part of our copending application Ser. No. 273,400 filed July 20, 1972 under the same title.

BACKGROUND OF THE INVENTION

This invention relates to an electrically-ignited lighter having a gas tank the supply of gas wherefrom is controlled by a valve operatively connected with a switch in the electrical gas-ignition circuit.

In hitherto known lighters of this type, gas ignition was obtained in various ways. For example, lighters are known which have galvanic cells connected to a capacitor which discharges via the primary winding of an ignition voltage transformer, to the secondary winding of which are connected the ignition electrodes. Disadvantageous in that case is the fact that the galvanic cells, mainly due to their varying qualities, do not have a sufficiently long storage life and have to be replaced frequently. In addition their capacity is low. In order for them to be adequate for a large number of gas ignitions, the lighter would have to contain galvanic cells of ridiculously large dimensions.

Lighters are also known which employ accumulators (i.e., rechargable batteries) as the ignition energy source. The accumulators must be frequently recharged which requires the provision of an additional charging device either incorporated into the lighter or separate therefrom. In any case, the recharging is a nuisance for the user.

Other known lighters operate with electro-magnetic energy transformers. These magnetic ignition systems, although independent on galvanic cells or accumulators and their charging devices, require high actuating forces and consequently require a not inconsiderable expenditure for apparatus to bring these forces into action within the limited space of a lighter.

Recently also piezoelectric elements have been used to produce the ignition energy. This indeed obviates the galvanic cells or accumulators with charging devices, but the user has to develop considerable forces. In addition the operation of this lighter is noisy.

OBJECTS AND SUMMARY OF THE INVENTION

The object of this invention is therefore to provide a gas lighter with electrical gas ignition which, on the one hand, is independent of both galvanic cells which must be constantly replaced as well as accumulators which have to be periodically charged and require special charging devices, and on the other hand, only requires slight actuating forces which can easily be developed in a lighter.

According to this invention, the above objects can be easily achieved by deriving the supply of ignition energy from at least one photoelectric cell. Our experiments have shown that the energy requirement for the ignition of a gas lighter, particularly a high voltage ignition, is only a few millijoules and that it is possible particularly with table lighters which are relatively large, to provide this by means of photoelectric cells.

For increased efficiency it is preferred to provide a plurality of photoelectric cells connected, via at least one matching resistance, in parallel with an energy storage device such as a miniature rechargable battery or a capacitor for example.

In the simplest case, the matching resistance is constituted by an ohmic resistance and this is adequate in many cases. However, optimum matching of the energy store and the photoelectric cells is not obtained if such a constant resistance is employed since the lighter will generally be subject to various levels of illumination ranging between total darkness and full sunlight and the characteristics of the photoelectric cells with change accordingly. It is therefore preferred to use a variable matching resistance such as, for example, a photoconductive cell the resistance of which varies automatically with the level of incident illumination between a small value with powerful illumination and a larger value with less illumination. Table lighters are generally kept in the open and therefore, even in winter with poor illumination, are exposed to the light for several hours so that sufficient energy can be produced and stored for a sufficient period to permit ignition of the table lighter even in darkness. To prevent the energy stored in the storage device from discharging through the photoelectric cells should their output fall below the stored voltage, e.g., during darkness or insufficient illumination, the matching resistance desirably is coupled with a diode poled to block such a discharge or alternatively and advantageously a photoelectric diode is used as the matching resistance.

As has already been mentioned above, the energy storage device can be a simple accumulator (rechargable battery) in a discharge path of which are connected an ignition switch and a filament or other means by which the gas flow may be ignited. Alternatively, the energy storage device can be a capacitor in a discharge both of which are connected on ignition switch and the gas ignition means which, in the case of a capacitive storage device which generally will not be capable of sustaining an appreciable discharge current for long enough to heat a filament will include the primary winding of an ignition transformer adapted to produce sufficient energy in its secondary to cause arcing across an ignition spark gap. Tests have shown that with a capacitive storage device an extraordinarily simple and advantageous table lighter is obtained. In well-lit rooms, the capacitor can be fully charged within a few seconds which suffices in almost all cases.

It can be advantageous to provide the energy storage device as a combination of one or more accumulators and capacitors, the accumulator(s) serving as an energy collector an being connected, generally via a resistor, to the capacitor(s) which serve as an energy distributor. The resistor limits the current which can be taken from the accumulator and can advantageously be so dimensioned that the capacitor can be recharged less than one second after an ignition. The provision of the capacitor enables the ignition energy to be supplied to the ignition transformer in accurately metered quantities which cannot be varied at will by the user, e.g., by unnecessarily prolonging the ignition period, which ensures economic energy consumption.

With constant ignition power, the capacitance of the capacitor is inversely proportional to the square of the selected voltage. When working with a low battery voltage, the currents to be switched during the capacitor discharge are therefore large. There is then a danger that the switch contacts may fuse, or alternatively the switch must be made large and provided with high contact pressure. It is therefore advantageous, to avoid the above-mentioned effects and also relative to advantageous dimensioning of the capacitor output voltage transformer, to operate the lighter with a higher voltage than that produced by the photoelectric cells. This could be achieved by series connection of relatively numerous, but at present still relatively costly photoelectric cells in conjunction with a corresponding series connection of accumulators, but in order to avoid the high costs for the photoelectric cells but still enable a small capacitor to be used, according to preferred embodiments of the invention, several accumulators are used which in a non-operative condition of the lighter are connected electrically in parallel with the photoelectric cells by means of mechanical switches and are connectable prior to ignition via the switches in series in the charging circuit to the capacitor of the high voltage ignition circuit. It is advantageous to use miniature Ni-Cd accumulators in the form of so-called button cells which are small and have a long life.

Another embodiment with voltage muliplication is characterised by several accumulators which in the non-operative condition are connected in parallel with the photoelectric cells via diodes and are separated from one another by multiple switches by means of which prior to ignition they are connectable in series in the charging circuit to the capacitor of the high voltage ignition circuit.

Voltage multiplication without muliple switching is obtainable by using a plurality of series connected accumulators individually connected in parallel with the photoelectric cells by means of diodes and separated from one another by series resistors, the arrangement furthermore being such that for operation of the lighter the several series connected accumulators can be switched across the capacitor in the ignition circuit for charging the capacitor with their added voltages.

It will be appreciated that as well as the arrangements described herein, other voltage multiplication circuits not illustrated can be built up. Tests have shown that successful operation can most conveniently be obtained with voltages of the order of three to four volts. Thus at least three Ni-Cd accumulators must be used as energy accumulators when voltage multiplication is obtained by connecting the accumulators in parallel for charging and in series for discharging.

By alternative and particularly favourable means for voltage multiplication is obtained if the photoelectric cells are connected to the energy store via a D.C. voltage converter. In this way it is possible to use a relatively small number of presently costly photoelectric cells for converting the light into electrical energy, and also the low output voltage of the photoelectric cells can be converted with simple means, which can easily be fitted into a lighter, to the higher direct voltage necessary for charging the energy (store). The provision of a voltage converter obviates the need to connect the accumulators in parallel for charging and in series for discharging.

Advantageously the components of the D.C. converter are combined to form a unit which is e.g., encapsulated and combined with the energy store (in the form of accumulators) to form a plug-in unit. Miniature Ni-Cd accumulators (known as button cells) are light, robust, completely enclosed, positionally independent and readily obtainable. The voltage of an Ni-Cd accumulator is about 1.2 volts. It is advantageous to combine four Ni-Cd accumulators into a pile by means of which a voltage of about 4.8 volts is obtained on the primary side of the ignition circuit.

D.C. voltage converters are known per se, and as such do not form the subject of the present invention. However, a particularly convenient construction is obtained if the components of the voltage converter are combined to form a unit which is placed inside a casing which then is inserted into an outer casing for the Ni-Cd accumulators. This results in a very simple prefabricated plug-in module which, like a battery, can be accommodated in the lighter housing. Tests have shown that the components of the D.C. converter only require a space of 3 to 4 cm$^3$. Such a construction permits rapid replacement of the D.C. converter e.g., in the event of faults, and equally easy replacement of the Ni-Cd accumulators. It is particularly advantageous for the transformer of the D.C. converter to have a cup core which has a smaller diameter than the Ni-Cd accumulators and to combine these parts to form a pile which may be housed in a cylindrical metal or plastics casing. The Ni-Cd accumulators can be placed between a spring contact in the base of the casing and a contact on the transformer core of the D.C. converter. The photoelectric cells can also be combined in a common casing with the D.C. converter and, if desired, with the energy storage accumulators. Such an arrangement is particularly advantageous for servicing.

According to a further preferred embodiment of the invention, a D.C. converter is arranged both between the photoelectric cells and the energy store and between the latter and the ignition spark gap. In this case the provision of a rectifier diode in the high voltage circuit to prevent discharge of the energy store via the photoelectric cells becomes superfluous.

The invention proposes several ways in which the photoelectric cells can be exposed to the light in the optimum way. According to one embodiment, the lighter has a casing upon which the photoelectric cells are mounted. In another embodiment the photoelectric cells are mounted on the lighter body behind corresponding apertures in the housing. The photoconductive cell or photoelectric diode are then located beside the photoelectric cells and are also exposed to the light. It is advantageous to arrange for the photoelectric cells to receive light via optical members such as a lens system and/or light guide. By such means it is possible to position the photoelectric cells at any desired, constructionally-favourable, protected position in the lighter body. In a preferred embodiment the optical system comprising photoelectric cells, photoconductive cell and/or photoelectric diode, and the lens system together with an insulating mounting plate is assembled as an independent complete unit. Other embodiments of this invention employ lenses and/or prisms to optimize the light capture by the photoelectric elements and to render the light capture substantially independent of the direction of incidence of the illuminating light.

The photoelectric cells and/or optical members may be technically so designed that at the same time they appear as decorative elements on the lighter.

Hereinafter, the construction and operation of various embodiments will be explained with the aid of the accompanying drawings illustrating preferred embodiments of the invention.

DESCRIPTION OF THE DRAWINGS

FIG. 13 shows a circuit diagram of a further embodiment of the invention;

FIG. 14 shows a constructional detail illustrating a power pack unit;

FIGS. 15, 15a, and 15b show construction details;

DETAILED DESCRIPTION

Figure 1:
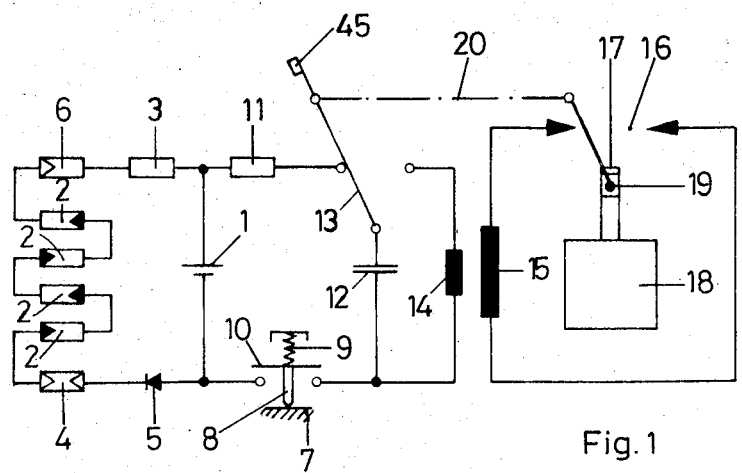
FIG. 1 shows the circuit diagram of a first embodiment having high voltage arc ignition.

FIG. 1 shows the circuit diagram of a table lighter with high voltage arc ignition. An accumulator 1, serving as the energy storage device of the lighter, is connected in parallel with four series-connected photoelectric cells 2 which serve as an energy generator for the lighter. The number of photoelectric cells provided depends on the nature of the cells and the intensity of illumination expected under charging conditions. Fundamentally, only one photoelectric cell need be provided.

Between the accumulator 1 and the photoelectric cells 2 is connected a matching resistance 3. Optimum matching between accumulator 1 and photoelectric cells 2 is not obtainable with a constant resistance 3. Since between darkness and full sunshine every level of illumination of the photoelectric cells must be expected, therefore it is preferred that the resistance 3 also is variable. With strong illumination the matching resistance must be small, whilst with less illumination it must be high. It can therefore be advantageous to connect in series or parallel with, or instead of, the resistance 3 a photoconductive cell 4 the resistance of which reduces with increasing illumination and vice versa.

In darkness or with insufficient illumination, the photoelectric voltage can fall to below the voltage of the accumulator 1. So that this does not then cause discharge of the accumulator via the photoelectric cells 2, a diode 5 is connected to block such a discharge. It is also possible to replace the matching resistance 3, photoconductive cell 4 and diode 5 by a photoelectric diode 6 or to combine a photoelectric diode with the resistance 3, whereby a good matching and the desired blocking action can be achieved.

For ease of illustration in the remaining FIGS., members 4, 5 and 6 are indicated together only by the resistance 3.

In FIG. 1, the accumulator 1 is connected via a resistance 11 and an automatically acting switch 10 to a capacitor 12 which forms a component of a per se known high voltage arc ignition circuit for lighters. On raising the table lighter from its base 7, a switch pin 8 protrudes from the base of the lighter under the action of a spring 9 and closes the switch 10 whereupon capacitor 12 is charged via a resistance 11. Resistance 11 limits the current taken from the accumulator 1 and may be selected so that the capacitor 12 is fully charged for example in less than one second.

Switch 10 is not absolutely necessary; however, owing to their high capacitance with small size, electrolytic capacitors are preponderantly used as capacitors, and these often have high leakage currents which, without switch 10, could under certain circumstances discharge the accumulator 1.

The recharging circuit between accumulator 1 and capacitor 12 takes in the resting contact path of a change-over switch 13, the operating contact path of which controls the high voltage ignition circuit. The changeover switch 13 can be operated as desired e.g., by means of a lever 45 in order to ignite the lighter.

After change-over switching of switch 13 out of its resting state as shown and into its operating state the capacitor 12 discharges in a very short time via the primary winding 14 of an ignition transformer in whose secondary winding 15 there is thus induced a high voltage which causes an arc across a spark gap 16 located above gas outlet 17 which is connected with a gas tank 18. A valve 19 serving to start and stop the gas flow is in per se known manner coupled by means of a linkage 20 or the like with the change-over switch 13 in such a way that on changing the change-over switch 13 the valve is opened or closed. For operating the table lighter only one member namely the change-over switch 13, therefore has to be moved. For this purpose considerably less force is necessary than when operating an electromagnetic ignition voltage generator or a piezoelectric ignition device.

By virtue of the provision of the capacitor 12, the ignition energy is supplied to the ignition transformer 14, 15 in an accurately metered manner. It cannot be varied at will by the user of the table lighter so that an economic energy consumption is ensured.

Figure 2:
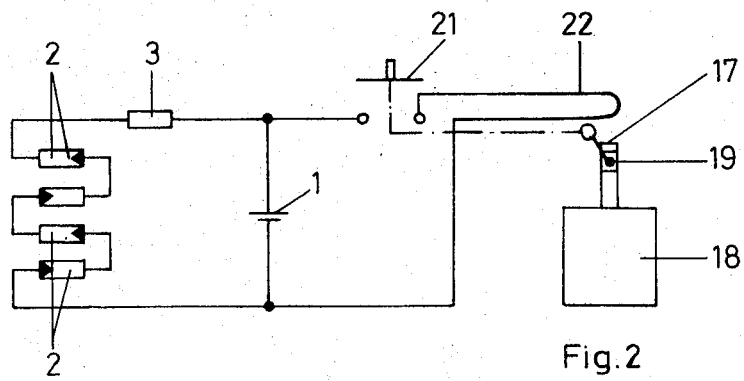
FIG. 2 shows the circuit diagram of a second embodiment having filament ignition.

A very simple electrically ignited table lighter is obtained with an arrangement according to FIG. 2. The energy store in this lighter is a single accumulator 1 which is connected continuously with the photoelectric cells 2 via a matching resistance 3. The ignition circuit is connected in via switch 21, and a filament 22 disposed above the gas outlet 17 is connected across accumulator 1 and, when switch 21 is closed, is caused to incandesce so that the gas flowing past ignites.

In this embodiment also it is convenient to interconnect valve 19 and switch 21 so that only one member needs to be activated. Since with filament heating considerably more energy is consumed than with the high voltage arc ignition according to FIG. 1, it is preferred, after gas ignition has taken place, to release switch 21 so that energy consumption is interrupted without however thereby closing valve 19. Release of the switch 21 can also be arranged to take place automatically for example by means of a bimetal which is in contact with the flame or by means of some other temperature-sensitive element. Closure of valve 19 can be manual or automatic in response to putting down the table lighter on a base 7.

The photoelectric cells 2 in the embodiment of FIG. 2 are continuously connected with the accumulator 1. Owing to the greater energy consumption associated with filament heating it is advantageous, with this embodiment, to make the accumulator 1 larger than in the embodiment according to FIG. 1.

In table lighters of the type described with reference to FIG. 1, with constant ignition power the size of the capacitor 12 is inversely proportional to the square of the voltage provided by the photoelectric cells 2. It is therefore advantageous to operate with a doubled or much higher voltage. Since, however, the price of a photoelectric cell 2 is much higher than that of an accumulator 1, it is inappropriate to correspondingly increase the number of series connected photoelectric cells 2. It is more convenient, when a higher voltage is required, to employ several accumulators, 1, 1.1, 1.2, etc., which on charging, i.e., in the non-operative position of the table lighter, are in parallel with the photoelectric cells 2 and, when the table lighter is in use, are discharged in series with capacitor 12.

According to the invention such a circuit can function purely mechanically with change-over switches, switches and diodes and, without movable parts, only with diodes and resistances.

Figure 3:
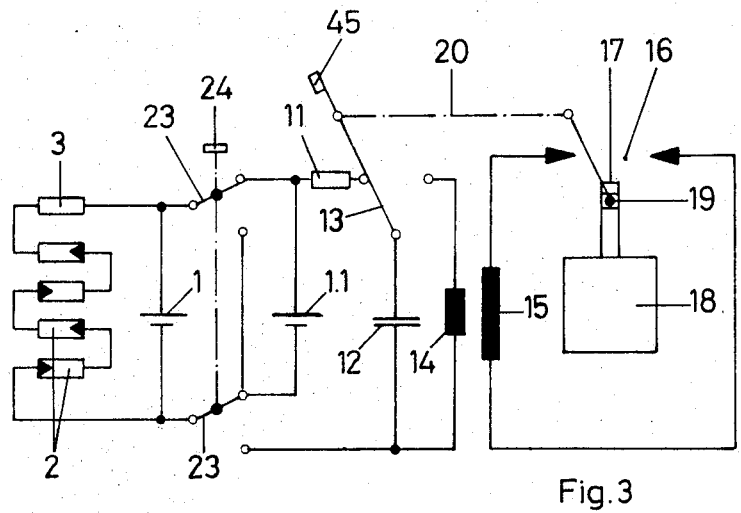
FIG. 3 shows the circuit diagram according to FIG. 1 incorporating a voltage doubler.

FIG. 3 shows a voltage doubling arrangement in which two accumulators 1 and 1.1. are so connected with a two-pole mechanical change-over switch 23 that, for charging, the accumulators 1 and 1.1 are in parallel with the photoelectric cells 2 and, for use of the table lighter, the change-over switch 23 must be brought into the other switching position (e.g., by pressing down a button 24) to place accumulators 1 and 1.1 in series to charge capacitor 12 with their summed voltages. As described hereinafter and shown in FIG. 6, the two-pole change-over switch 23 can, in a simple manner, be arranged to be brought into the correct switching position automatically.

In the following FIGS. 4 and 5 the components of the high voltage ignition circuit to the right of actuating switch 13, i.e., the primary and secondary windings 14, 15, spark gap 16, gas outlet 17, gas tank 18, valve 19 and lever 20 are no longer shown. They are not important for understanding the invention and have already been explained in detail in conjunction with FIG. 1.

Figure 4:
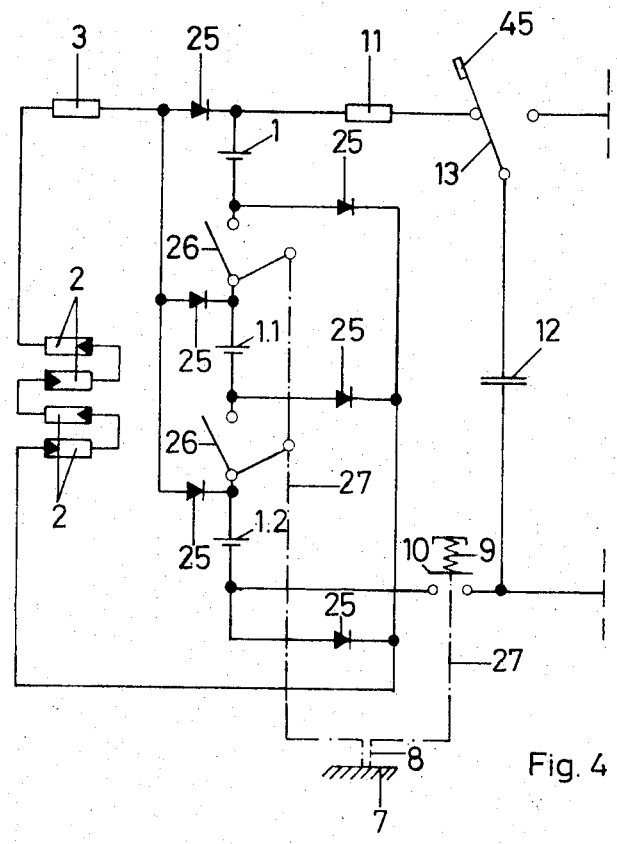
FIG. 4 shows a partial circuit diagram of a high voltage arc ignition system with a voltage trebler.

FIG. 4 shows a circuit in which the energy-generating photoelectric cells 2 are in operative connection with the components of the energy store, i.e., accumulators 1, 1.1, 1.2 etc, via diodes 25 and switches 26 in order to bring about a trebling of the voltage. The switches 26 can be coupled via linkages 27 with the switch pin 8 of switch 10 so that switches 10 and 26, under the action of spring 9, automatically close on lifting the table lighter from the base 7. With switches 10 and 26 closed, accumulators 1, 1.1 and 1.2 are series connected so as to charge capacitor 12 with treble the voltage developed across the photoelectric cells. The parallel connection of accumulators 1, 1.1 and 1.2 for their recharging takes place automatically when the table lighter is put down onto base 7 which operates switch pin 8 to open the switches 10 and 26.

Figure 5:
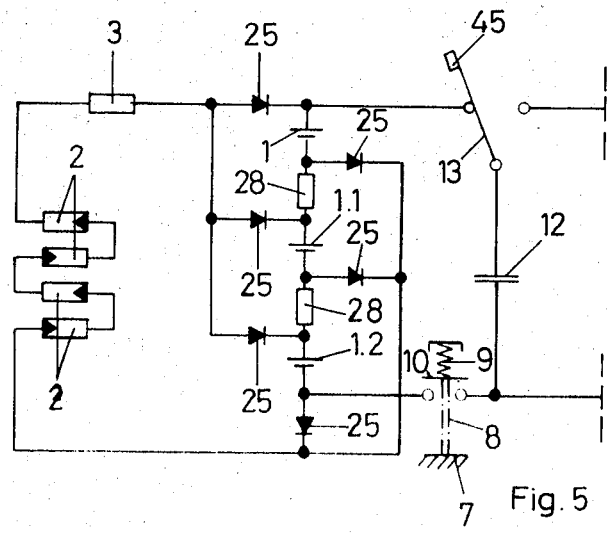
FIG. 5 shows a partial circuit diagram of a further embodiment of a high voltage arc ignition system with a voltage trebler.

FIG. 5 shows a circuit for trebling the operating voltage wherein only diodes 25 and resistances 28 are used, i.e., there are no movable members. As can be seen from the drawing, with switch 10 open the accumulators 1, 1.1 and 1.2 are all connected in parallel with the photoelectric cells 2, whilst with the switch 10 closed they are series connected to charge capacitor 12 with the sum of their individual voltages.

In the circuit according to FIG. 3 there is no need for the switch 10 because capacitor 12, in the non-operative position of the table lighter, is isolated by change-over switch 23 and no leakage current can flow. However, in the circuits according to FIGS. 4 and 5, it is advantageous to provide the switch 10 because, without this switch, part of the energy supplied by the photoelectric cells 2 would be consumed by the leakage current of capacitor 12. With weak illumination, i.e., when the charging voltage of the photoelectric cell 2 is smaller than the accumulator voltage, accumulators 1, 1.1 and 1.2 would, with no switch 10, discharge via capacitor 12.

FIGS. 3, 4 and 5 only show examples of voltage multiplication systems. With the means shown and described any other voltage multiplication circuit can be produced. When using presently available photoelectric cells, one to three accumulators 1, 1.1 and 1.2 will be sufficient.

Figure 6:
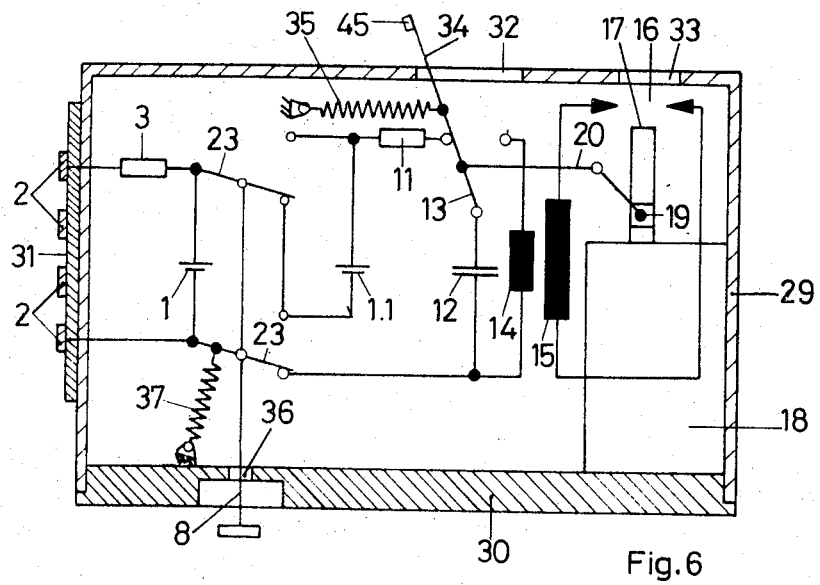
FIG. 6 shows a schematic longitudinal section through a table lighter having an electrical circuit as shown in FIG. 3 and provided with automatic change-over switching for voltage doubling.

FIG. 6 shows schematically in longitudinal section a table lighter employing the circuit of FIG. 3 and arranged for automatic voltage doubling.

The table lighter of FIG. 6, is enclosed by a housing 29 and closure member 30. To a side wall of the housing 29 there is attached an insulating plate 31 whereon are located the photoelectric cells 2. In the top of the housing 29, openings 32 and 33 are provided for the actuating lever 34, which operates the change-over switch 13 and the valve 19, as well as for a flame outlet. The actuating lever 34 is returned by a spring 35 which always brings the lever 34, once releaseed, into the "off" position as shown in FIG. 6. When the table lighter is not in use, the primary winding 14 is separated from capacitor 12 and the valve 19 is closed.

The two-pole change-over switch 23 is provided with a switch pin 8 which projects through an opening 36 in the closure 30 and is movable against the action of a spring 37. If the table lighter is located on a base, then the switch pin 8 is forced upwardly by the weight of the table lighter against the action of spring 37 whereupon it switches change-over switch 23 to accumulator charge, i.e., switching accumulators 1 and 1.1 in parallel with the photoelectric cells.

As is already known with other electrically ignited table lighters, the gas valve can be locked in the open position so that the table lighter can be handed round without it being necessary to hold the operating lever 34 or 45. Release of the gas valve can be arranged to take place by means of switch pin 8 or similar means in an automatic manner when returning the table lighter to its place.

Figures 7, 8:
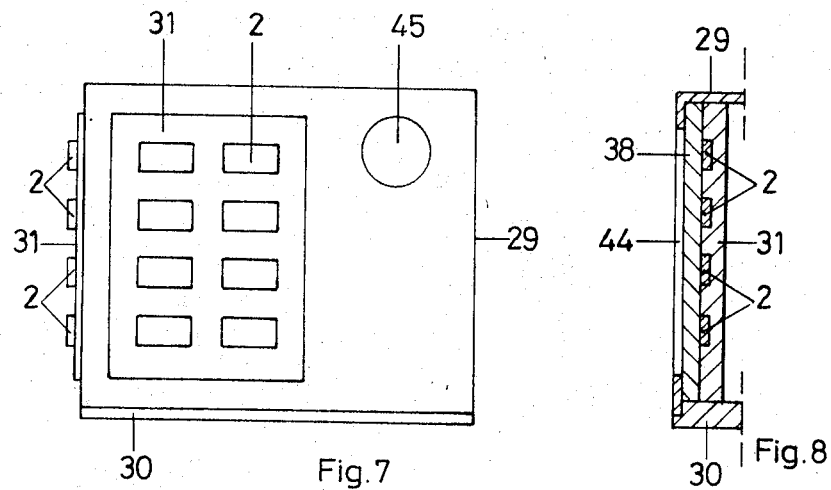
FIG. 7 shows a schematic front view of a table lighter with photoelectric cells located on the sides of the lighter casing.
FIG. 8 shows schematically a partial cross-section of a table lighter having a different arrangement of the photoelectric cells.

The photoelectric cells 2, photoconductive cell 4 and/or the photoelectric diode 6 must be exposed to the light and must therefore be located on the outside of housing 29 or behind apertures 44 therein. FIG. 7 shows the front view of such a table lighter, on the front of which to the left beside the operating lever 45 and on the left hand side thereof are located photoelectric cells 2 mounted on an insulating plate 31.

In another embodiment according to FIG. 8, the photoelectric cells 2 are arranged behind an aperture 44 in a wall of housing 29. For protection against contact damage, they are covered by a transparent disc 38 or by a layer of protective lacquer. The rear covering is again an insulating plate 31.

Figure 9:
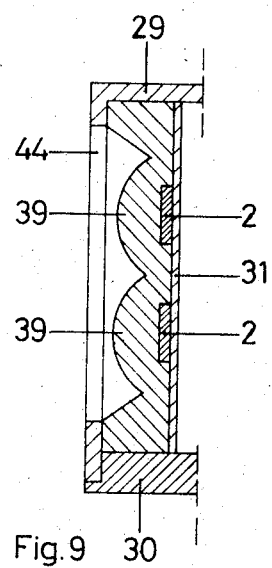
FIG. 9 shows a constructional detail of an optical system.

It is particularly advantageous to arrange the transparent disc 38, which serves for covering purposes, in the form of a convergent lens system. In this way it is possible in a simple and cheap manner to raise the illumination intensity at the surfaces of the photoelectric cells. Such a lens system need not be made from expensive ground glass, but instead cheap transparent thermoplastics or moulded glass can be used. FIG. 9 shows a partial cross section through a table lighter of such a construction. Behind the aperture 44 in the wall of the housing 19 is arranged the lens system 39. The photoelectric cells 2 are located in cavities. An insulating plate 31 serves for sealing purposes.

Figure 10:
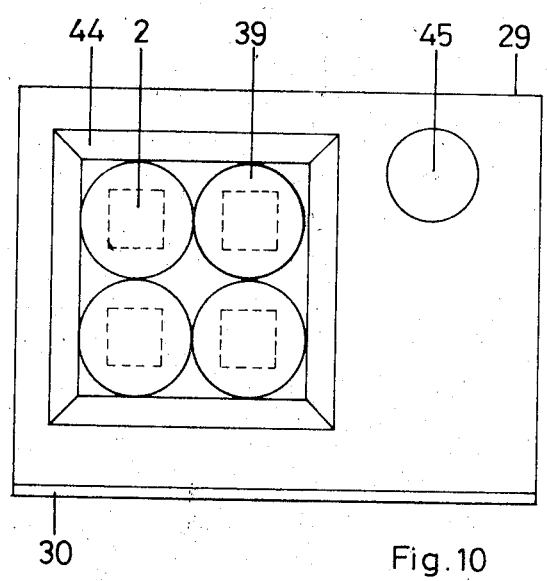
FIG. 10 shows a front view of a table lighter incorporating an optical system as shown in FIG. 9.

FIG. 10 shows a front view of the table lighter according to FIG. 9 and as above described.

It is of course also possible to use only a single convergent lens. The cheap manufacture of such a member is however only possible by means of moulding or injection moulding. However due to the necessary short focal length, such a lens is rather thick in the centre leading to incident points and dissymmetries. Since however in addition the lenses can also have affects which will influence the appearance of the table lighter the multi-lens system according to FIGS. 9 and 10 is preferable.

The optical system comprising photoelectric cells 2, photoconductive cell and/or photoelectric diode 6, lens system 39 and insulating plate 31 can be combined into a complete independent unit.

As already mentioned, photoelectric cells are expensive and should therefore be protected from risk of damage. One way of doing this is to locate the photoelectric cells well within the housing 29 so as to be protected thereby, and to supply the light to them via per se known but not shown light guides.

To open a table lighter according to the invention for servicing for example it must be possible to remove the housing 29 from the actual lighter body 40. If photoelectric cells are fixed in the housing 29, the connections between them and the accumulators 1, 1.1, etc., must be either in the form of flexible leads or more conveniently via automatically separating contacts.

Figure 11:
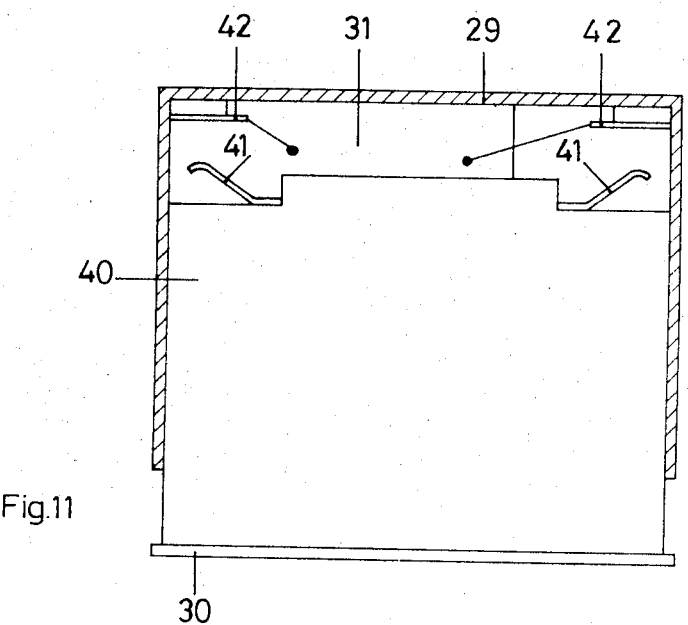
FIG. 11 shows a longitudinal section through a table lighter with the casing partially removed.

FIG. 11 shows such an arrangement. The housing 29, which is shown in broken open form and therefore shows part of the insulating plate 31 which serves as the rear covering for the pjotoelectric cells, is partially removed from the lighter body 40. To the top of this body 40 are attached spring contacts 41 which, when housing 29 is pushed completely onto body 40, come into contact with the fixed contacts 42 located under the covering of housing 29 and thereby restore the electrical connection between the photoelectric cells 2 and the accumulators 1, 1.1, etc. Fixed and spring contacts can also be interchanged. An easily detachable connection can also be brought about by sliding contacts or other equivalent means.

In place of manual operation of the lever 34, it is also possible to use a small electromagnet (not shown) to operate the change over switch 13 and open valve 19. With such an arrangement the user of the table lighter would only have to operate a small contact e.g., via a push button or a handle 45. If the valve 19 was arranged to be automatically locked in the "open" position, the push button could be released immediately after ignition without the table lighter being extinguished.

Figure 12:
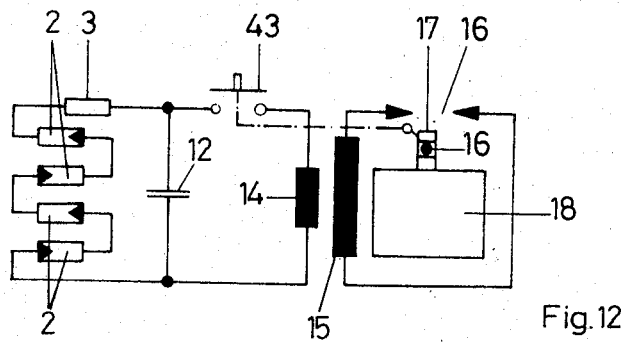
FIG. 12 shows a circuit diagram of a lighter with high voltage arc ignition without accumulators.

It has been found that it is also possible to use as the sole energy store, a capacitor 12 without the combination of accumulators 1. The energy supplied by the photoelectric cells 2 is then used directly for charging the capacitor 12. Tests have shown that this occurs in well-lit rooms in a few seconds. Such a lighter can be extremely simple, as is shown in FIG. 12. The photoelectric cells 2 are connected directly across capacitor 12 via resistance 3, and the primary winding 14 of an ignition transformer is connected in parallel therewith. In a connecting lead, is provided a normally open switch 43. If this is closed the lighter ignites. If such a lighter is constructed as a table lighter, the capacitor 12 is generally sufficiently charged for immediate use. When made as a pocket lighter, depending on the illumination one must wait for a shorter or longer time before ignition is possible.

FIG. 13 shows the circuit diagram of yet a further embodiment of the invention wherein the photoelectric cells 2 are connected via a d.c. voltage converter 100 to the energy accumulators 1, 1.1, 1.2, 1.3. The d.c. converter 100 converts the low output voltage of the photoelectric cells into the higher d.c. voltage necessary for charging the accumulators 1, 1.1, 1.2, 1.3.

D.C. Voltage converters are known per se in numerous designs and circuits. They all function according to a similar principle; the d.c. voltage supplied is chopped and transformed through a transformer to a desired higher or lower voltage and subsequently rectified. According to FIG. 13 the photoelectric cells 2 are connected via input terminals 101, 102 to the d.c. converter 100 comprising two capacitors 105, 106, a resistance 107, a transistor 108, and a transformer 109, having primary winding 110, secondary winding 111 and feed-back winding 112. For rectification purposes, a diode 113 is provided. The d.c. converter 100 is connected via output terminals 103 and 104 to an ignition circuit such as is known from the previous embodiments.

The d.c. converter 100, which in the present embodiment is in the form of a one-shot blocking transformer, starts functioning with low illumination and initiates a charging process of the energy store. Charging can take place throughout the day even during the evening hours and under artificial lighting. As the maximum spectral sensitivity of silicon photoelectric cells is approximately between 0.8 and 0.9 $\mu$m, i.e., displaced approximately in the direction of red, illumination by the bulbs generally used in living rooms, is well suited as the energy emitter for silicon photoelectric cells.

The d.c. converter 100 is constructed from commercially available components and takes up a space of about 3 to 4 cm$^3$. For the protection of sensitive components, particularly the thin wire coils, the components of the d.c. converter can be combined into a unit and possibly encapsulated. This unit preferably forms with the energy accumulators 1, 1.1, 1.2, 1.3, advantageously comprising button cells, a plug-in unit. The electrical connections can be via flexible leads using solder or plug connections or via spring contacts. In the latter case the d.c. converter can be replaced by simply inserting or removing it from the space allocated for accomodating it in the lighter. This is important, both from the assembly standpoint and for after sales service, because it is not necessary to remove screws or break soldered joints.

FIG. 14 shows in detail an arrangement wherein four Ni-Cd accumulators are provided in the form of a pile and are constructed as a unit with the d.c. converter. In an outer casing 115, a leaf spring 117 with a contact 118 is fixed to the base 116. Above it the Ni-Cd cells 1, 1.1, 1.2, 1.3 are arranged. From the open end, an inner casing 114 is inserted in the outer casing 115, which casing 114 contains all parts of the d.c. converter 100 such as capacitors 105, 106, resistance 107, transistor 108, transformer 109 with windings 110, 111 and 112 and diode 113. The transformer 109 is appropriately fixed to an insulating plate 121 provided with solder pins (connection pins) 120, on the other side of which plate are arranged the remaining d.c. converter elements. As far as necessary the ends of the leads are passed through the base 122 of inner casing 114. As shown in FIG. 14 they can terminate in contact points. The outer and inner casings 115 and 114 can be held together by friction, screw threads, adhesive or any other suitable means. For the internal connection of energy store 1 and diode 113, a contact 123 is provided on the core of transformer 109.

The compact plug-in unit 98 according to FIG. 14 can also be easily replaced by untrained personnel. It can take no more space than a conventional battery in battery lighters.

FIGS. 15, 15a and 15b show a further development of the invention. The photoelectric cells 2 and d.c. converter 100 are arranged in the common housing 128. FIG. 15 shows the common housing 128 from below, FIG. 15a is a side view and FIG. 15b a plan view. FIG. 15a shows that the d.c. converter 100, in the same arrangement as in FIG. 14, can be accomodated in housing 128. FIGS. 15, 15a show further that in the housing 128 a cavity 129 can be provided which, between the contact 123 (cf. FIG. 14) and contact spring 117, accomodates accumulators 1, 1.1, 1.2, 1.3.

Without changing the fundamental features of the invention the housing 128 shown in FIGS. 15 can also be arranged in the lighter casing to serve as an operating lever.

Housing 128 can be provided with a cavity which is open at the bottom or the side for the button cells. The cavity 129 permits easy replacement of the cells after removing the lighter casing.

Figure 16:
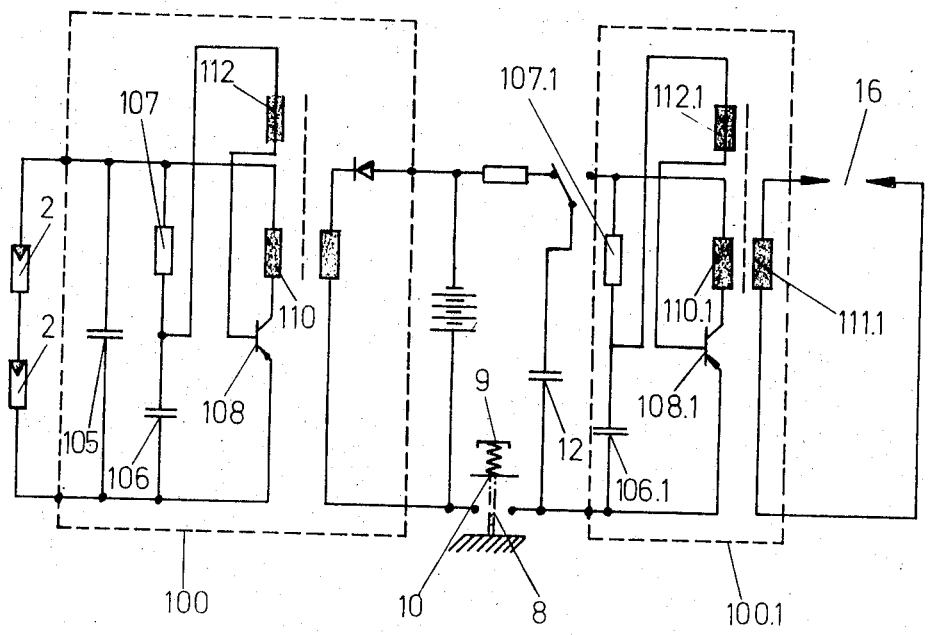
FIG. 16 shows the circuit diagram of a further embodiment of the invention.

FIG. 16 shows the circuit diagram of a further embodiment of the invention wherein d.c. converters 100 and 100.1 are provided both between the photoelectric cells 2 and the accumulators 1, 1.1, 1.2, 1.3 and between the latter and the ignition spark gap 16. The ignition transformer, 14, 15 located behind the ignition capacitor 12 in the previous embodiment of FIG. 13 is replaced by a d.c. converter 100.1 in which the rectifier diode 103 provided in d.c. converter 100 can be eliminated because it does not matter so far as spark ignition is concerned whether direct or alternating current is used. The same references are used to denote the components of d.c. converter 100.1 as are used for corresponding parts of d.c. converter 100 except that a 1 is added.

Figure 17:
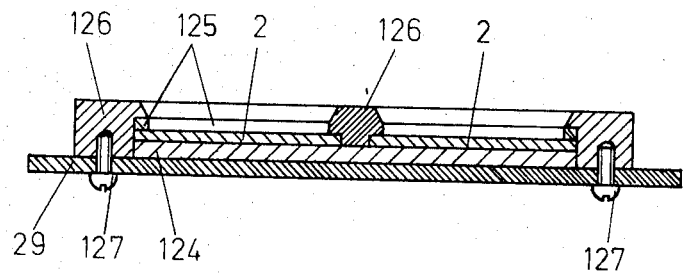
FIG. 17 shows in cross-section a construction detail illustrating a particularly convenient arrangement of the photoelectric cells.

FIG. 17 shows a particularly advantageous connection of the housing 29 with one or more photoelectric cells in the form of very thin silicon discs which are fragile and easily breakable. According to FIG. 17, the silicon discs are placed between, or at least on one side on, a very elastic material e.g., rubber or foam. On housing an elastic elastic discs 124 is arranged whereon is located the photoelectric cell 2 the edge of which is in turn covered by a cut-out elastic disc 125. This arrangement is held together by a frame 126 which can for example be fixed in place by screws 127 on housing 29. The same applies for other photoelectric materials.

When using a d.c. converter between the photoelectric cells 2 and the energy store, matching means, e.g., the ohmic resistance 3, photoconductive resistance 4 or diode 5 or the photoelectric diode 6, in the charging circuit becomes superfluous. An energy flow, i.e., a discharge of the energy store via the photoelectric cells in the case of weak illumination or darkness, is not possible due to the galvanic separation in the d.c. converter. In addition, the circuit of the d.c. converter 100 can be designed so that there is an almost automatic optimum matching of the charging capacity to the radiant light energy converted by the photoelectric cells.

Figure 18:
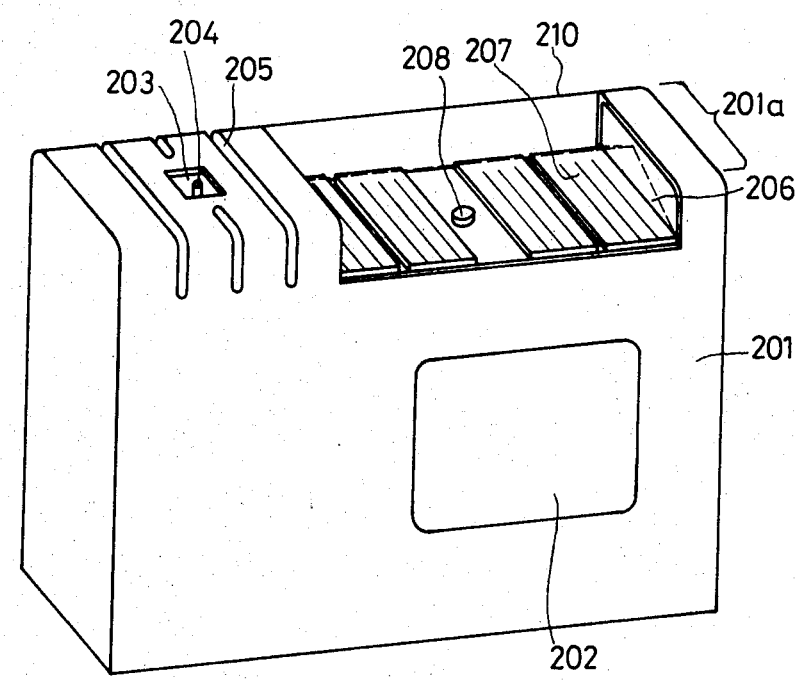
FIG. 18 shows a perspective view of one advantageous form of lighter constructed to obtain optimised light capture by the photoelectric elements.

FIG. 18 shows a lighter having a box-like lighter casing 201 with an operating member 202 provided on one side wall thereof. In the upper edge surface 201a of the lighter casing 201 there are provided air inlets 205 and a flame opening 203 wherein is positioned a burner nozzle 204. The gas flowing out of the burner nozzle 204 is arranged to be ignited as previously described by means of a high voltage electrical spark.

In an opening in the upper edge surface 201a, covered by a transparent protective cap 210, there is provided a prism 206 beneath which are arranged photoelectric elements 207 and a resistance 208 whose electrical conductivity is dependent on the incident light intensity. The photoelectric elements 207 and 208 cooperate as previously described with a rechargeable energy store.

Figure 19:
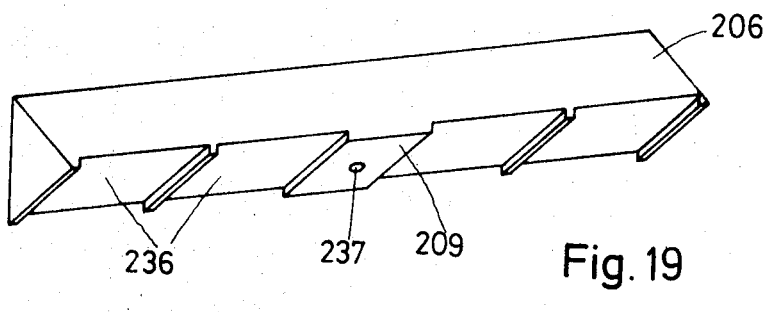
FIG. 19 shows a prismatic optical member employed in the lighter of FIG. 18 to optimize light capture by the photoelectric elements.

FIG. 19 shows the prism 206 provided in its base surface 209 with recesses 236, for accomodating the photoelectric elements 207, and a receiving opening 237 for the resistance 208 whose conductivity is dependent on the light intensity; where this resistance is not cylindrical, a receiving opening corresponding to its shape can be provided.

As can be seen from FIG. 18 the transparent protective cap 210 is arranged to conform with the external shape of the lighter casing 201, although it will be appreciated that if the prism 206 and the photoelectric elements 207 and 208 were to be arranged on edge surface 201a, then the transparent protective cap 210 would have to be shaped correspondingly. Alternatively it could be completely eliminated.

Figure 20A:
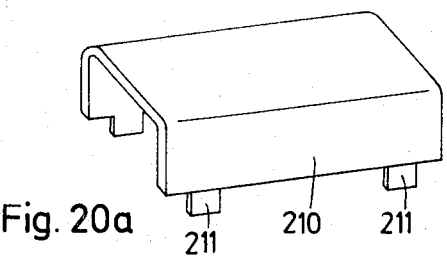
FIGS. 20a, 20b and 20c show constructional details of a transparent cover forming part of the lighter of FIG. 18.
Figure 20C:
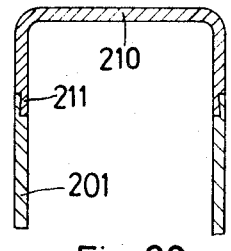
Figure 20B:
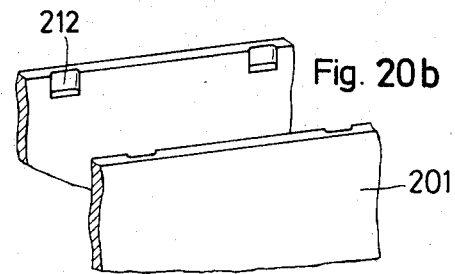

FIG. 20a shows in detail the protective cap 210, having downwardly bent over sides wherefrom project tags 211 which serve for detachable attachment of the protective cap 210 to the side walls of the box-like lighter casing 201 in the manner shown in FIG. 20b. To receive tags 211, recesses 212 are provided on the inside of the side walls of the lighter casing. FIG. 20c shows in cross-section the transparent protective cap 210 mounted on the lighter casing 201. The latter is under tension due to the fact that tags 211 abut firmly against the insides of recesses 212. It is advantageous to arrange the transparent protective cap 210 to fit in a dust-tight manner on the lighter casing 201.

Tests have shown that better illumination of the photoelectric elements 207,208 can be obtained with the aid of a prism 206. This improvement in illumination occurs with normal light, but is even more noticeable with laterally incident light. The improvement in light capture is substantially independent of the particular direction from which the light falls on the lighter.

The lighter need not be positioned in a preferred direction relative to the light, which would be the case if photoelectric elements 207, 208 were located on a side wall of the lighter casing 201. The prism 206 even captures light which is directed parallel to the surface of the photoelectric elements 207.

It will thus be seen that by using a prism as the optical member and arranging a plurality of phoeoelectric elements juxtaposed underneath the base surface of the prism, the prism and the photoelectric elements advantageously being arranged along an edge surface of the lighter casing where they are favourably exposed to the available light, the photoelectric elements will even be illuminated by light incident at a relatively acute angle to the surface of the photoelectric elements. Good light yield can even be obtained by means of the prism when the light is incident upon the prism from a direction substantially parallel to the surface of the photoelectric elements.

Figure 21:
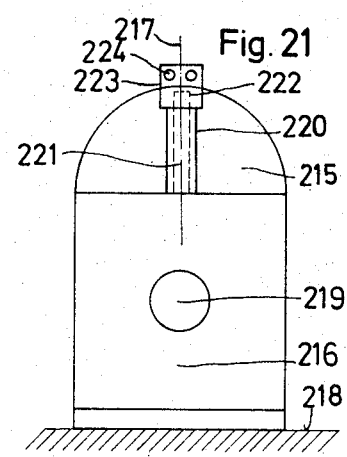
FIG. 21 shows another lighter constructed to optimize light capture.

FIG. 21 shows a further embodiment of the invention designed for optimised light capture and characterized by the provision of a convergent lens 215, which is constructed as the head of a cylindrical lighter casing 216. The optical axis 217 of the convergent lens 215 is perpendicular to the surface 217 on which the lighter stands, which leads to a particularly high directional independence. In addition, by means of convergent lens 215 it is possible to utilise relatively weak light intensities for energy conversion purposes. Convergent lens 215 can be made so convex and thick that the photoelectric elements 207 can be arranged at an optimum distance with respect to the focus of the convergent lens.

Reference numeral 219 designates the operating member by means of which the high voltage ignition circuit can be set into operation and, at the same time, the burner valve also opens.

Concentric with the optical axis 217, there is formed a bore 220 through the convergent lens 215 for accommodating a gas supply pipe 221 and a burner nozzle 222. To prevent damage to the convergent lens 215 by the flame, the burner nozzle 222 is surrounded by a protective tube 223 (which can be made of metal or of heat resistant and/or thermally insulating material) in which air inlets 224 are provided. It will be appreciated that the air inlets could be made in the cylindrical lighter casing 216 or in the convergent lens 215. The air would then be supplied to burner nozzle 222 through bore 220.

Figure 22:
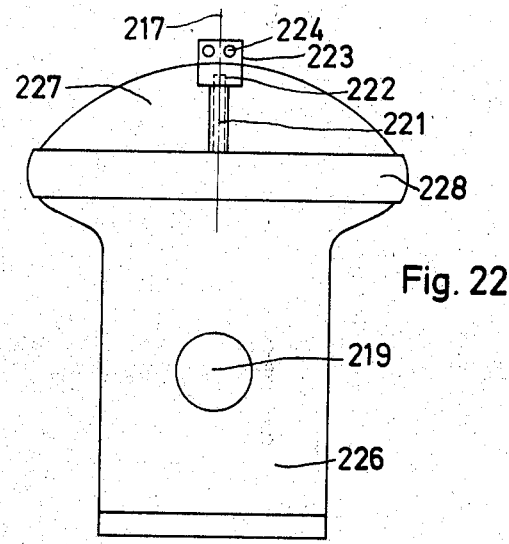
FIG. 22 shows a modified form of the lighter of FIG. 21.

The embodiment of FIG. 21 combines a handy and convenient lighter shape with an optimisation of the light capture of the photoelectric elements. In FIG. 22 there is shown a preferred embodiment of the invention similar in concept to that of FIG. 21 but with the diamter of the cylindrical lighter casing smaller than the diameter of the convergent lens which is in the form of a mushroom-shaped head. This embodiment is characterised by an easily handleable shape with a very good light yield even using relatively small photoelectric elements. In addition it is substantially independent of the direction from which the light is incident.

Referring now to FIG. 22, a convergent lens 227 is used whose diameter is greater than the diameter of the cylindrical lighter casing 226. The convergent lens 227 and the cylindrical lighter casing 226 are combined together by means of a beaded ring 228. FIG. 22 shows the convergent lens 27 constructed as a mushroom-shaped head for the cylindrical lighter casing 226. The arrangement of the gas supply pipe 221 and burner nozzle 222 within the protective tube 223, and the air holes 224 can correspond to the embodiment of FIG. 21.

Figure 23:
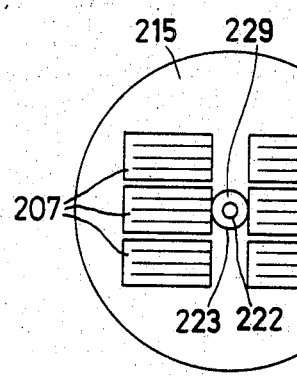
FIGS. 23 and 24 show plan views illustrating possible arrangements of the photoelectric elements in the lighters of FIGS. 21 and 22.
Figure 24:
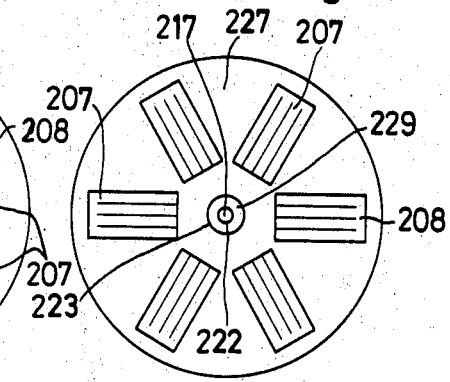

FIGS. 23 and 24 shows a lighter according to FIG. 21 or FIG. 22 in plan view. As shown, the photoelectric elements 207 and 208 can be arranged individually or in groups beneath the convergent lens 215. FIG. 22 shows the phoeoelectric elements 207, 208 arranged symmetrically about the optical axis 216 of convergent lens 227 which is the preferred arrangement for optimizing light capture.

On the inner casing of protective tube 223 there is provided a metal member 229 which acts as an ignition electrode relative to burner nozzle 222.

Figure 25:
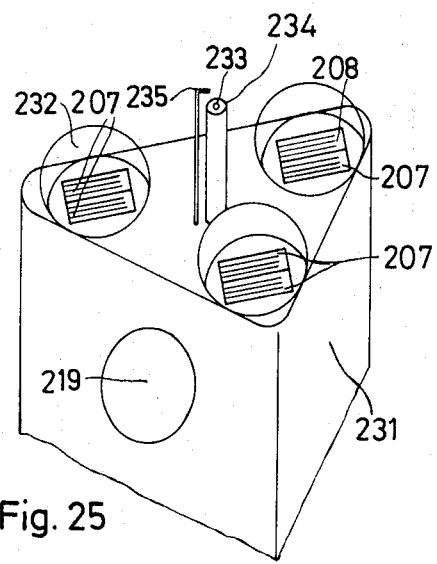
FIG. 25 shows a perspective view of the upper part of a further lighter constructed to optimize light capture by the photoelectric elements.

In a further embodiment according to FIG. 25, three convergent lenses 232 each individually associated with at least one photoelectric element are provided which are arranged on the upper surface of a cylindrical lighter casing 231 adjacent to a burner nozzle 233. The cylindrical lighter casing 231, like the lighter casings 216 and 226, can have a round, triangular, square or any other random cross section. More or less convergent lenses 232 can be arranged on the upper surface of the casing depending, for example, on the cross-section thereof. This optically favourable arrangement has the advantage that repairs to the photoelectric elements can be carried out more easily and cheaply than in arrangements where all the photoelectric elements are combined beneath a single convergent lens.

Burner nozzle 233 extends sufficiently far in the upward direction that correct use of the lighter is possible. Burner nozzle 233 is again surrounded by a protective pipe 234 provided with air inlets (not shown). Adjacent the protective pipe 34, there is provided a metal member 235 which acts an ignition electrode.

The combination of the lenses and/or prisms with the photoelectric elements is facilitated by providing recesses or receiving apertures in the prisms or in the convergent lenses in the manner shown for example in FIG. 19. In order not to inhibit light transfer between the optical members and the photoelectric elements, the latter can be stuck by means of transparent adhesives to the prisms or convergent lenses.

We claim:

1. An electrically ignited gas lighter including at least one photoelectric transducer for converting light energy into electrical energy, electrical storage means connected to said at least one photoelectric transducer for storing electrical energy developed thereby during illumination thereof, an ignition circuit including means selectively operable to energise gas ignition means from said electrical storage means for lighting the lighter, a gas valve operable with said means operable to energise gas ignition means, and at least one light refracting optical element associated with said at least one photoelectric transducer to enhance capture thereby of light incident thereupon.

2. An electrically ignited gas lighter as claimed in claim 1 wherein said light refracting element is mounted in an edge surface of a generally box-shaped lighter casing so as to be in a favourable position to intercept light incident upon the lighter.

3. An electrically ignited gas lighter as claimed in claim 2 including a transparent protective cap secured to the lighter casing and enveloping said light refracting element.

4. An electrically ignited gas lighter as claimed in claim 1 wherein said light refracting element comprises a convergent lens which constitutes the head of a cylindrical casing of the lighter.

5. An electrically ignited gas lighter as claimed in claim 4 wherein the diameter of the lens is greater than that of the cylindrical casing.

6. An electrically ignited gas lighter as claimed in claim 4 wherein a bore is provided in the convergent lens concentric with the optical axis thereof, and a gas supply pipe terminating in a burner nozzle is accommodated within said bore.

7. An electrically ignited gas lighter as claimed in claim 6 including means to shield the lens from the heat of a flame burning at said burner nozzle.

8. An electrically ignited gas lighter as claimed in claim 1 including a plurality of photoelectric transducers and a plurality of optical elements associated therewith, for optimizing light capture thereby, each of said optical elements being individually associated with at least one photoelectric transducer.

9. An electrically ignited gas lighter comprising a casing, gas storage means in said casing, a gas supply control valve connected with said gas storage means, an operating lever for said gas supply control valve, an electric switch, said operating lever also being coupled for controlling the operation of said electric switch, electrically operated gas ignition means coupled to said electric switch to be controlled by the switch operation, electrical storage means coupled with said switch for connection thereby to said gas ignition means for lighting the lighter, at least one photoelectric transducer coupled to supply electrical energy to said electrical storage means, and light refracting means associated with said at least one photoelectric transducer to optimize capture thereby of light incident thereupon.

* * * * *

UNITED STATES PATENT OFFICE
CERTIFICATE OF CORRECTION

Patent No. 3,850,570     Dated November 26, 1974

Inventor(s) Hermann Remy and Adolf Lamprecht

It is certified that error appears in the above-identified patent and that said Letters Patent are hereby corrected as shown below:

Column 3, line 45 - before alternative, "By" should be --An--;

Column 12, line 24 - figure 1 should be in quotes --"1"--.

Signed and sealed this 4th day of March 1975.

(SEAL)
Attest:

RUTH C. MASON
Attesting Officer

C. MARSHALL DANN
Commissioner of Patents
and Trademarks